United States Patent
Armstrong

(10) Patent No.: US 11,550,518 B2
(45) Date of Patent: Jan. 10, 2023

(54) SYSTEM AND METHOD FOR PROVIDING SMART PRINT SETTINGS

(71) Applicant: CANON KABUSHIKI KAISHA, Tokyo (JP)

(72) Inventor: Charles Armstrong, Rancho Santa Margarita, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/192,677

(22) Filed: Mar. 4, 2021

(65) Prior Publication Data

US 2022/0283752 A1 Sep. 8, 2022

(51) Int. Cl.
*G06F 3/12* (2006.01)
*G06K 9/62* (2022.01)

(52) U.S. Cl.
CPC .......... *G06F 3/1204* (2013.01); *G06F 3/1257* (2013.01); *G06K 9/6223* (2013.01); *G06K 9/6253* (2013.01); *G06K 9/6257* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 8,582,149 B2 | 11/2013 | Kohama | |
| 8,705,125 B2 | 4/2014 | Mori | |
| 9,001,340 B2 | 4/2015 | Miyazawa | |
| 9,216,591 B1 | 12/2015 | Rozier et al. | |
| 9,858,019 B2 | 1/2018 | Nakayama et al. | |
| 9,870,182 B2 * | 1/2018 | Fukuda | G06K 15/021 |
| 2019/0306341 A1 * | 10/2019 | Matysiak | G06F 3/167 |
| 2020/0142654 A1 * | 5/2020 | Imai | G06F 3/1259 |

\* cited by examiner

*Primary Examiner* — Frantz Bataille
(74) *Attorney, Agent, or Firm* — Canon U.S.A., Inc., IP Division

(57) ABSTRACT

A system provides features for retrieving a print job. The print job includes print data, a source application and source job data type. The system determines if the print job requires a user activity analysis based on the source application and the source job data type. If user activity analysis is required, request a user-activity machine-learning model to provide user activity analysis data. The system establishes a relation between the print job and the user activity analysis data to generate input information to a job-data classification machine-learning model. The job-data classification machine-learning model provides print job data classification details as input information to a print setting recommendation learning model. The print setting recommendation machine-learning model processes the received print job data classification details and outputs a print setting recommendation. The system applies the print setting recommendation to the print job and processes the print job on the image processing device.

15 Claims, 10 Drawing Sheets

| Home=yes<br>Importance=low<br><br>1 | Home=yes<br>Importance=medium<br><br>2 | Home=yes<br>Importance=high<br><br>3 |
|---|---|---|
| Home, Score < Threshold<br>Importance=low<br><br>4 | Home=0.5, Work=0.5<br>Importance=medium<br><br>5 | Home or Work Score <<br>Threshold<br>Importance=high<br><br>6 |
| Work<br>Importance=low<br><br>7 | Work<br>Importance=medium<br><br>8 | Work<br>Importance=high<br><br>9 |

FIG. 6

SYSTEM AND METHOD FOR PROVIDING SMART PRINT SETTINGS

BACKGROUND

Field

The present disclosure relates generally to a system of controlling an image processing device, and more specifically, system and method for providing smart print settings.

Description of the Related Art

In a print system, configuration of print settings before printing a print job is not a mandatory operation. However, due to various types of printing applications and image processing devices, the output print job may have unexpected results requiring further operations of manually setting the correct print settings for the print job.

Currently, there are various default print settings available for print jobs. For example, manufacturers provide drivers for each image processing device with factory default print settings that can be used for printing. With user default settings, the user will need to configure print intent for the current print job and select print settings accordingly. Otherwise, the last used print settings or the default print driver settings will be used for printing. In addition, for selection of the default settings, either the last used settings or the default print driver settings, there is also application default print settings. Various applications (e.g. Microsoft's 'Word', 'Excel', 'PowerPoint') manage their own specific default print settings and could save the last selected print settings as application default print settings for the user. If the user does not make any changes to the print settings, the application default print settings will be used for submitting the next print job.

In the enterprise environment, default print settings are pre-configured by an administrator who can create a custom driver through the manufacturer provided tools and distributes the driver to the enterprise users. The default print settings are managed based on cost saving policies set by the enterprise and cannot be changed by the user. However, by enforcing the default print settings, adverse effects may occur, such as a figure to be printed in color mode instead of in grayscale mode, as each print job may require different print settings than the enterprise default print settings. This results in the user not knowing whether the print intent will be correctly reflected in the print job, which may lead to more waste in materials used as the intended print job is resent for another print processing.

There are currently no means for an intelligent system to automatically manage the print settings based on the print job content data, enterprise policies, and other user printing patterns.

BRIEF SUMMARY

A system according to the present disclosure remedies any drawbacks associated with these conventional systems. Methods, systems, and non-transitory computer-readable media for integrating machine-learning models for automatically generating print settings based on the print job content data, enterprise policies, and other user printing patterns are described.

An embodiment according to invention principles provides retrieving a print job, wherein the print job includes print data, a source application and source job data type; determining if the print job requires a user activity analysis based on the source application and the source job data type, wherein if user activity analysis is required, request a user-activity machine-learning model to provide user activity analysis data; establishing a relation between the print job and the user activity analysis data to generate input information to a job-data classification machine-learning model, wherein the job-data classification machine-learning model provides print job data classification details as input information to a print setting recommendation learning model, the print setting recommendation machine-learning model processes the received print job data classification details and outputs a print setting recommendation; applying the print setting recommendation to the print job and process the print job on the image processing device.

Further features of the present disclosure will become apparent from the following description of exemplary embodiments with reference to the attached drawings.

BRIEF DESCRIPTION OF THE DRAWINGS

FIG. 6 illustrates exemplary flow diagrams setting forth various algorithms executed by computing devices used to implement the portioning of print jobs based on k-means clustering algorithm according to the present disclosure.

DETAILED DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

Although various default settings are available, a user's print intent is desired when submitting future print jobs.

To address these concerns, the present disclosure provides a system for retrieving a print job, wherein the print job includes print data, a source application and source job data type. The system determining if the print job requires a user activity analysis based on the source application and the source job data type, wherein if user activity analysis is required, request a user-activity machine-learning model to provide user activity analysis data. The system establishing a relation between the print job and the user activity analysis data to generate input information to a job-data classification machine-learning model, wherein the job-data classification machine-learning model provides print job data classification details as input information to a print setting recommendation learning model, the print setting recommendation machine-learning model processes the received print job data classification details and outputs a print setting recommendation and applying the print setting recommendation to the print job and process the print job on the image processing device.

Figure 1:
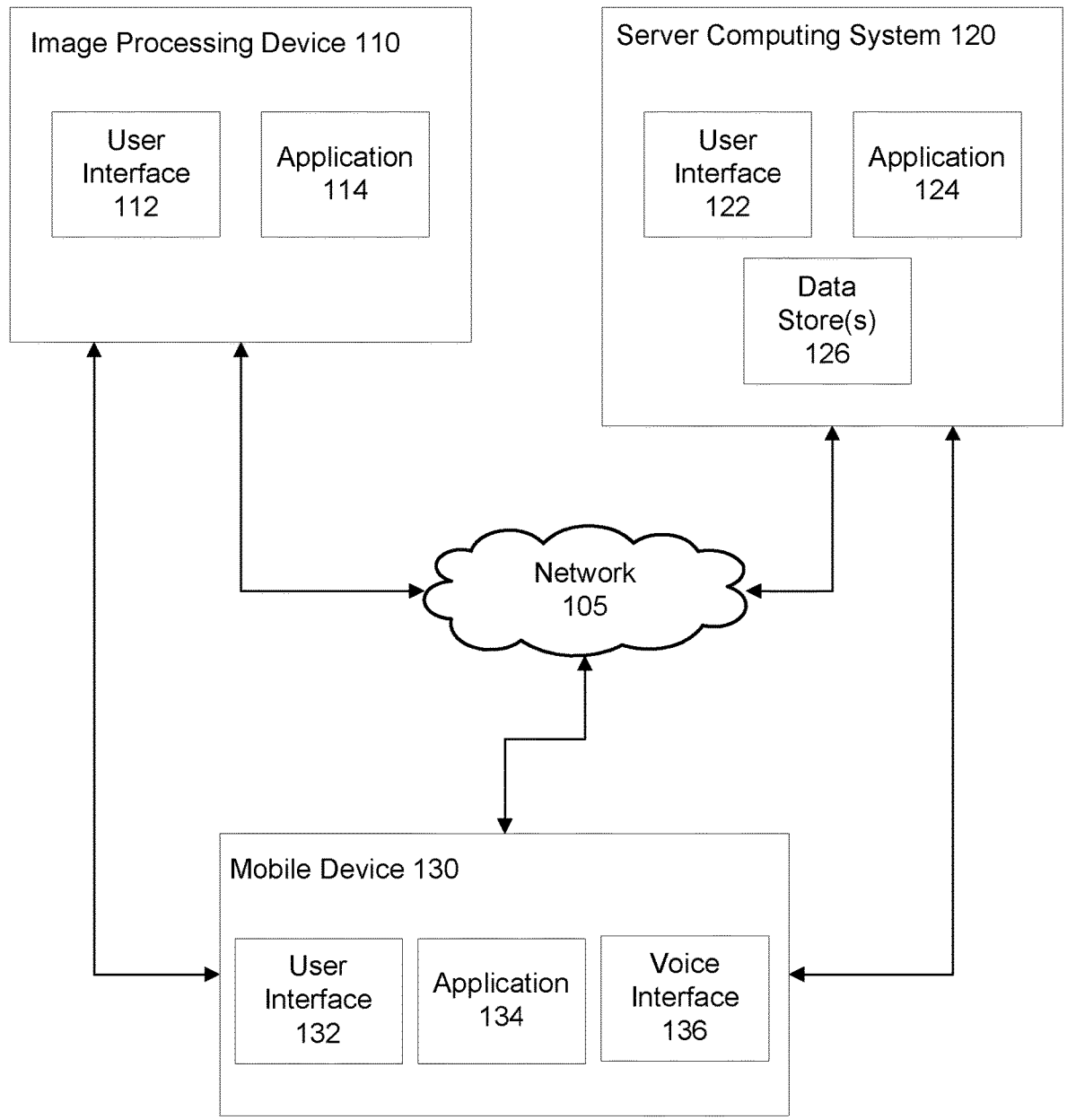
FIG. 1 illustrates an exemplary embodiment of a system for integrating a machine-learning model for automatically generating print settings based on the print job content data, enterprise policies, and other user printing patterns.

FIG. 1 illustrates an example embodiment of a system for integrating a machine-learning model for automatically generating print settings based on the print job content data, enterprise policies, and other user printing patterns. FIG. 1 illustrates an example network environment 100 that includes at least one image processing device 110, at least one server 120 controlled by a manufacturer of the at least one image processing device 110 and at least one mobile device 130 able to selectively communicate directly or indirectly with the at least one image processing device 110 and the at least one server 120. Each of the components described herein are interconnected via a communication network 105 enabling one of bidirectional or unidirectional communication there between.

The network 105 that couples the components shown in FIG. 1 may be any suitable network that uses any suitable communication protocol for communicating data between the various components. For example, one or more portions of the network 105 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 105 may include one or more networks. The network 105 may be a wireless communication network, a wired communication network or a combination of both.

While FIG. 1 depicts an image processing device 110, the following description will reference the components of the image processing device 110. However, it should be understood that the description of the components of the image processing device 110 is applicable to any other image processing device. The image processing device includes hardware, software, or both for providing the functionality of the image processing device 110. In some embodiments, the image processing device 110 performs one or more steps of one or more methods described or illustrated herein. In some embodiments, the image processing device 110 provides functionality described or illustrated herein. In some embodiments, software running on the image processing device 110 performs one or more steps of one or more methods described or illustrated herein or provide functionality described or illustrated herein.

In some embodiments, the image processing device 110 includes hardware, software, or both for providing printing functionality. For example, the image processing device 110 may selectively receiving electronic signals including data generated by one or more applications executing on a computing device (not shown) that is to be output via a printing function. The image processing device 110 may parse the data and control various components of a printing unit to acquire a substrate on which the data is to be printed and cause toner from a toner reservoir to be affixed to the substrate, and output the substrate to the user.

In some embodiments, the image processing device 110 includes hardware, software, or both for providing scanning functionality. For example, the image processing device 110 may include an image sensor or a camera for capturing an image. In some embodiments, the image processing device 110 scans a physical document to generate electrical signals which are converted to digital image data representing the scanned physical document. The image processing device 110 may convert the digital image data into an electronic document representing the scanned physical document and send the electronic document to a destination.

In some embodiments, the image processing device 110 includes hardware, software, or both for providing photocopying or other type of reproduction functionality. The reproduction functionality may include aspects of both the printing and scanning functionality described above whereby an image of an original physical document is captured and then reproduced for output to further physical document.

The image processing device 110 includes the user interface 112. The user interface 112 includes hardware, software, or both for providing the functionality of the user interface 112. The user interface 112 may include an operation panel. The user interface 112 may output signals and receive input signals via the operation panel so as to facilitate interaction between a user and the image processing device 110. An operation panel may include a hard key panel and/or a touch sensitive display. A user may provide user input operations via the hard key panel and/or the touch sensitive display to control the image processing device. For example, the user may press one or more hard buttons to issue one or more commands. Another example, a user may provide a touch input to an interface element displayed on the display to issue a command and/or to make a selection. As a further example, the image processing device 110 may output information to the user and issue requests by outputting images on a display.

In some embodiments, a browser may execute on the image processing device 110. In some embodiments, the user interface 112 comprises information displayed by the browser. The browser may be a web browser such as Microsoft Internet Explorer, Google Chrome or Mozilla Firefox, and maybe used to access a resource, such as a web page. The browser may enable a user to display and interact with text, images, form elements, or other information typically located on a web page served by a web server or the World Wide Web or a local area network. The browser may support various types of downloadable, executable, software modules, such as applets or plug-ins. For example, the browser may support various types of downloadable, executables, software module, such as applets or plug-ins. For example, the browser may incorporate a virtual machine configured to execute a program, such as a JAVA applet, embedded in a web page accessed by the browser. The image processing device 110 may have various add-ons, plug-ins, or other extensions for user in or with the browser.

The image processing device 110 may include at least one application 114 comprising programs and related data. The application 114 may include a set of instructions representing one or more algorithms that are stored in a memory, storage device and/or computer-readable storage medium that are selectively executed by a processor which loads the set of instructions into active memory to perform the functionality detailed in the algorithm. In some embodiments, the application 114 executing on the image processing device 110 performs one or more steps of one or more methods described or illustrated herein or provides functionality described or illustrated herein. By way of example and not by way of limitation, programs of the application 114 may include instructions which, when executed by one or more processors, cause the one or more processors to perform one or more operations described with respect to FIG. 4.

In some embodiments, the application 114 executing on the image processing device 110 provides functionality for maintain and accessing information in a data structure, which may be any suitable data structure for organizing data. For example, information associated with a user or process may be added as one or more entries into a data structure. The application 114 executing on the image processing device 110 may store and/or retrieve data in a memory or on a hard disk of the image processing deice 110. In some embodiments, the image processing device 110, when executing the application 114, may perform various data store. Examples of operations include adding entries to a data store, deleting entries from a data store, modifying entries in a data store, searching for entries in a data store, and retrieving entries from a data store.

The application 114 executing on the image processing device 110 may provide functionality for generating information and providing the information to the user interface 112 of the image processing device 110. The information may include text, images, form elements, files, executable programs, or other suitable information. The information provided by the application 114 may include content for display on a display of the image processing device 110.

In some embodiments, the application 114 includes one or more programs for recommending print settings based on metadata generated through a machine-learning model to provide classifications regarding print job content data, enterprise policies, or with recognition of user printing patterns which are outputted to another machine-learning model to provide the correct user print intent for the recommended print settings by using the various recommendation models.

The server 120 includes hardware, software, or both for providing the functionality of the server 120. The server 120 may include one or more servers. For example, the server 120 may include one or more applications servers, authentication servers, web servers, file servers, database servers or mail servers. In some embodiments, the server 120 is unitary. In some embodiments, the server 120 is distributed. The server 120 may span multiple locations. The server 120 may span multiple machines.

The user interface 122 of the server 120 includes hardware, software, or both for providing the functionality of the user interface 122. The user interface 122 may be coupled to output data to a display enabling a user of the server 120 to view information generated, stored or otherwise processed by the server 120. The user interface 112 may output signals and receive input signals via so as to facilitate interaction between a user and the server 120.

In some embodiments, a browser may execute on the server 120. In some embodiments, the user interface 122 comprises information displayed by the browser. The browser may be a web browser such as Microsoft Internet Explorer or Mozilla Firefox, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as JAVA applets, embedded in a web page accessed by the browser. The server 120 may have various add-ons, plug-ins, or other extensions for use in or with the browser.

The server 120 may include at least one application 124 comprising programs and related data. In some embodiments, the application 124 executing on the server 120 performs one or more steps of one or more methods described or illustrated herein or provide functionality described or illustrated herein. By way of example and not by way of limitation, programs of the application 124 may include instructions which, when executed by one or more processors, cause the one or more processors to perform one or more operations described with respect to FIG. 4.

In some embodiment, the application 124 executing on the server 120 provides functionality for maintaining and accessing information in a data structure, which may be any suitable data structure for organizing data. For example, information associated with a user or process may be added as one or more entries into a data structure. The application 124 executing on the server 120 may store and/or retrieve data in a memory or on a hard disk of the server 120. In some embodiments, the server 120, when executing the application 124, may perform various operations with respect to data store 126. Examples of operations include adding entries to a data store 126, deleting entries from a data store 126, modifying entries in a data store 126, searching for entries in a data store 126, and retrieving entries form a data store 126.

A mobile device 130 including a user interface 132, application 134, and a voice interface 136 may also communicate with any one of the components described above in FIG. 1 enabling a user of the mobile device to avail themselves of data generated by the respective components. The voice interface 136 including a multi-language interface for voice input in different languages or dialects where a microphone records voice input by a user, a voice recognition processing to recognize the received voice input according to voice print identification, and performing actions using voice input to allow for device control. The mobile device may be any portable computing device including a laptop, tablet, smartphones, smart speaker, etc.

Figure 2:
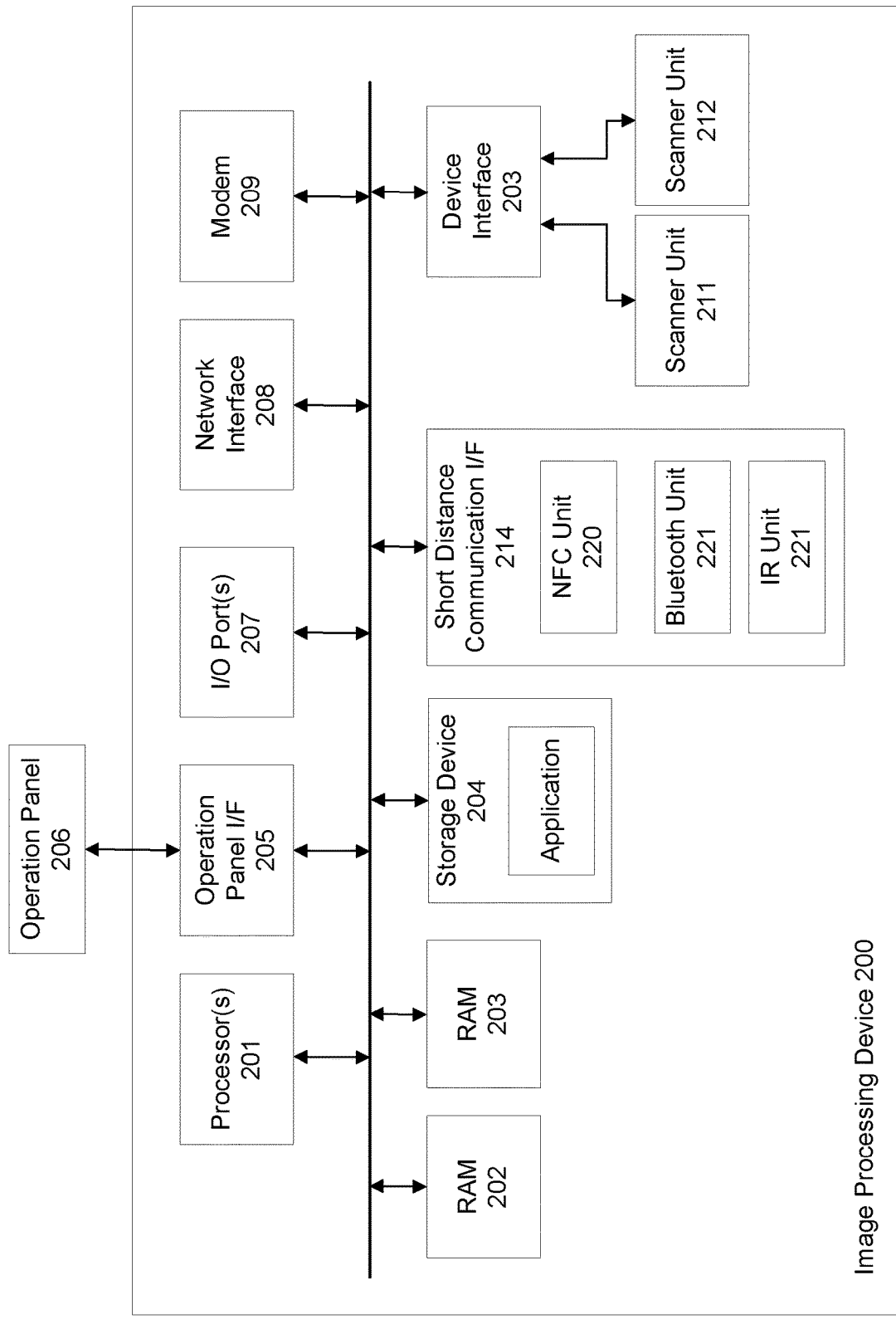
FIG. 2 illustrates a block diagram of an exemplary image processing device according to the present disclosure.

FIG. 2 illustrates an example image processing device 200. In some embodiments, the image processing device 110 of FIG. 1 comprises the image processing device 200. The image processing device 200 may be a multifunction peripheral having a scanning function in addition to printing, copying and other functions. However, it will be understood that various other implementations of an image processing device are within the scope of the present disclosure. For example, various components, modules, functions, and/or configurations of the image processing device 200 could be combined, deleted, or modified to form further implementations. In some embodiments, other devices such as a stand-alone scanner, fax machine, or other devices with scanning capabilities and/or computing systems may be implemented as the image processing device 200.

In some embodiments, the image processing device 200 performs one or more operations described herein. In some embodiments, the image processing device 200 provides functionality described herein. In some embodiments, one or more software applications running on the image processing device 110 performs one or more operations described herein. Applications executing on the image processing device 200 and which provide specific types of functionality are in communication with and bidirectional communicate data between the applications executing on the image processing device 200.

The image processing device 200 includes one or more processor(s) 201. The processor(s) 201 include a central processing unit (CPU) that performs overall control functions for the image processing device 200. The CPU uses a random access memory (RAM) 202 as a work area while executing instructions. The CPU executes various instructions of various applications and/or programs stored in one or more memory devices 204. For example, the CPU executes programs stored in read only memory (ROM) 203 and in a storage device 204.

In some embodiments, the processor(s) 201 include one or more processors in addition to the CPU. By way of example, the processor(s) 201 may include one or more general-purpose microprocessor(s), application-specific microprocessor(s), and/or special purpose microprocessor(s). Additionally, in some embodiments the processor(s) 201 may include one or more internal cache for data or instructions.

The processor(s) 201 provide the processing capability required to execute an operating system, application programs, and various other functions provided on the image processing device 200. The processor(s) 201 perform or cause components of the image processing device 200 to perform various operations and processes described herein, in accordance with instructions stored in one or more memory devices 204.

The RAM 202 is used as a work area when the processor(s) 201 execute various instructions, such as those making up computer programs stored in the ROM 203 and/or the storage device 204. The RAM 202 may be used as a temporary storage area for various data, including input image data and data created by an application executing on the image processing device 200 or data received from one or more mobile computing devices 130 which is then further processed by one or more applications executing on the image processing device 200. The RAM 202 may be used as cache memory. In some embodiments, the RAM 202 may be dynamic RAM (DRAM) or static RAM (SRAM).

The ROM 203 stores data and programs having computer-executable instructions for execution by the processor(s) 201. In some embodiments, the ROM 203 is a boot ROM, storing instructions for the booting process. In some embodiments, the ROM 203 may be flash memory. In certain instances, the ROM 203 may include an operating system for controlling the operation of the image processing device 200. In this case, an operating system application stored in ROM 203 (or alternatively stored in the storage device 204 and accessible once the boot routine of the image processing device 200 is completed), contains a catalog of other applications executing on the image processing device 200 and provide information about such other executing applications to one another enabling interoperation there between.

The storage device 204 stores application data, program modules and other information. One or more program modules stored in the storage device 204 are configured to cause various operations and processes described herein to be executed. The storage device 204 also stores other programs and data to be processed. For example, the storage device 204 stores an operating system including programs and data for managing hardware and software components of the image processing device 200. Applications on the image processing device 200 may utilize operating system to perform various operations. The storage device 204 may further store other programs and/or drivers that enable various functions of the image processing device 200, graphical user interface (GUI) functions, and/or processor functions. The storage device 204 may also store data files including, for example, image data, user data, configuration information, GUI components, such as graphical elements or templates, or other data required by the image processing device 200.

In some embodiments, the image processing device 200 includes one or more applications including one or more programs for controlling access to one or more resources on the image processing device 200. In some embodiments, applications stored in the storage device 204 includes one or more programs for controlling access to one or more applications (or particularly functionality thereof) executing on the image processing device 200.

In some embodiments, access to one or more resources of the application is controlled based on credentials associated with the entity attempting to access the one or more resources of the application. Policies for controlling access to various resources of the application may be stored at the image processing device 200. In other embodiments, access control policies may reside in a centralized or enterprise server remotely located from the image processing device 200. Once access to an application is granted, a user gains access to one or more resources of the application, including task-specific functionality of the application. The task-specific functionality of the application may enable the user to perform one or more tasks using the application. For example, the application may provide various functions, features and user interface for processing image data, transmitting data over a network, managing one or more databases, or other task. In some embodiments, the application is configured to use one or more resources of the image processing device 200 to perform a process in response to an instruction from the user.

In some embodiments, the application executing on the image processing device 200 provides communication functionality for transmitting file or other electronic document data file formats via a network to any other computing system and/or server connected thereto. The communication functionality of the application may be implemented by interaction with the network interface 208 which converts data into a transmissible data form able to be communicated over a network 105 to server 120 (or other computing system). In addition to, or stead of using the network interface 109, application functionality that requires transmission of data may be performed using the short distance communication interface 214, including any and all types of short distance communication described herein. The application may also enable the image processing device 200 to receive instruction data from other systems on the network enabling access to and control of any functionality provided by the application. The receipt of data from the server or other computing device may similarly occur using any of the network interface 208, short distance communication interface 214 or the like. The communication functionality of application may also enable the image processing device 200 to receive and process data objects generated by any systems connected to the image processing device 200 via the network 105.

In some embodiments, the application executing on the image processing device 200 provides functionality for maintaining and accessing information in a data structure, which may be any suitable data structure for organizing data. For example, information associated with a user or process may be added as one or more entries into a data structure.

The application executing on the image processing device 200 may store and/or retrieve data in a memory or on a hard disk of the image processing device 200. In some embodiments, the image processing device 200, when executing the application, may perform various operations with respect to a data store. Examples of operations include adding entries to a data store, deleting entries from a data store, modifying entries in a data store, searching for entries in a data store, and retrieving entries from a data store. The data store management functionality provided by application discussed above is also applicable to data stores located on remote computing system and/or servers connected to the image processing device 200 via the network 105.

An operation panel interface 205 provides output signals to and receives input signals from an operation panel 206. Regarding the output signals, the operation panel interface 205 provides GUI data to the operation panel 206 for display on a liquid crystal display (LCD). Regarding the input signals, the operation panel interface 205 receives input signals based on user input operations at the operation panel 206 and relays the input signals to the processor(s) 201. In some embodiments, the operation panel 206 includes a touch sensitive element operable to receive user input operations or commands based on the touching of graphical objects displayed on the display. In some embodiments, the operation panel 206 includes a hard key panel.

The image processing device 200 includes one or more input/output (I/O) port(s) 207. The I/O port(s) 207 may include any suitable interface type such as a universal serial bus (USB) port, FireWire port (IEEE-1394), serial port, parallel port, or AC/DC power connection port. The I/O port(s) 207 enable one or more external device(s) 215 to communicate with the image processing device 200 when the external device(s) 215 is/are connected to the I/O port(s) 207. Examples of external devices 215 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 208 includes hardware, software, or both providing one or more interfaces for communication (such as, for example, packet-based communication) between the image processing device 200 and one or more other computing systems or one or more networks 216. As an example and not by way of limitation, the network interface 208 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 216 and any suitable network interface 208 for it. As an example and not by way of limitation, the image processing device 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 216 may be wired or wireless. As an example, the image processing device 200 may communicate with a wireless PAN (WPAN), a WI-FI network, a WI-MAX network, or other suitable wireless network or a combination of two or more of these. The image processing device 200 may include any suitable network interface 208 for any of these networks 216, where appropriate.

A modem 209 modulates/demodulates image data and control signals. The modem 209 is connected to the Public Switched Telephone Network (PSTN) 217 and performs input/output of information between the image processing device 200 and the PSTN 212. By way of example, the modem 209 may send/receive facsimile communications.

The device interface 210 is connected to the scanner unit 211 and to the printer unit 212. The device interface 210 performs synchronous/asynchronous conversion of image data.

The scanner unit 211 includes a light source and an image sensor. The scanner unit 211 may include a glass platen and/or an automatic document feeder (ADF). In operation, the light source illuminates a physical document positioned on the glass platen or fed by the ADF. Light reflected by the physical document reaches the image sensor reaches the image sensor, and the image sensor converts the light into electrical signals. In some embodiments, the scanner unit 211 includes an optical system (for example, mirrors, lens) that directs the light to the image sensor. After the image sensor generates the electrical signals, an analog-to-digital converter converts the electrical signals to digital image data representing the scanned physical document. The scanner unit 211 then outputs the digital image data to one or more other components of the image processing device 200 via the device interface 210.

The printer unit 212 is an image output device for printing on a sheet an image corresponding to image data. In response to a print command received at the image processing device 200, the printer unit 212 receives image data via the device interface 210 and outputs to a sheet an image corresponding to the image data.

The image processing device 200 may also include a short distance communication interface (I/F) 214. The short distance communication interface 214 facilitates communication between one or more applications executing on the image processing device 200 and at least one mobile computing device (not shown) using one or more short distance communication protocols. Thus, the short distance communication I/F 214 includes a near field communication unit 220 (for example, an NFC reader) enabling bidirectional communication with a mobile computing device having NFC functionality. The NFC unit 220 includes circuitry and software that enables transmission (writes) and reception (reads) of commands and data with a non-contract type device using a short distance wireless communication technique such as NFC (Near Field Communication; ISO/IEC IS 18092). In other embodiments, the short distance communication I/F 214 may also include a Bluetooth communication unit 221 that includes a transceiver capable of transmitting and receiving data via short wavelength radio waves ranging in frequency between 2.4 GHz and 2.485 GHz. In other embodiments, the short distance communication I/F 214 may also include an infrared (IR) unit that can emit and sense electromagnetic wavelengths of a predetermined frequency have data encoded therein. Furthermore, while not specifically shown, the short distance communication I/F 214 may also include a smart card reader, radio-frequency identification (RFID) reader, device for detecting biometric information, a keyboard, keypad, sensor(s), a combination of two or more of these, or other suitable devices. In some embodiments, the short distance communication I/F 214 may include an optical scanner configured to capture and scan image data representative of an identification code such as a barcode or a QR code. The capture and processing of a particular identification code may initiate the short distance communication between the mobile computing device 130 and the image processing device 200.

The depiction of the short distance communication I/F 214 is done merely to facilitate the understanding of the operation of the present arrangement and it should be understood that the short distance communication I/F 214 may also be embodied as part of the I/O ports 207 and/or the network interface 208.

A system bus 218 interconnects various components of the image processing device 200 thereby enabling the transmission of data and execution of various processes. The system bus 218 may include one or more types of bus structures including a memory bus or memory controller, a peripheral bus, and a local bus using any of a variety of bus architectures.

Figure 3:
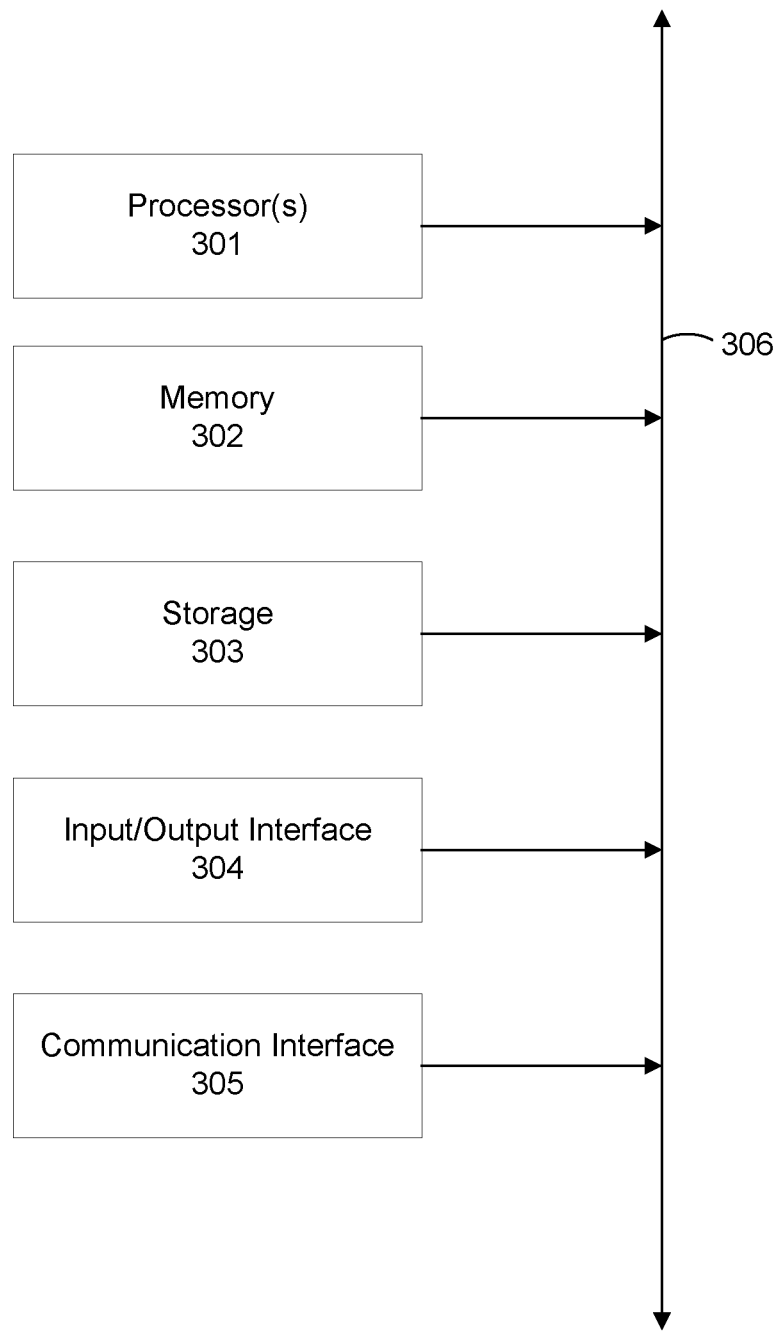
FIG. 3 illustrates a block diagram of an exemplary computing device according to the present disclosure.

FIG. 3 illustrates an example computing system 300. According to various embodiments, all or a portion of the description of the computing device 300 is applicable to all or portion of one or more of the image processing device 110, the server(s) 120, and the mobile computing device 130.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal modules (such as memory and processor) work together to perform operations on electronic data. Also, the term resource as used herein includes but is not limited to an object that can be processed at a computing system. A resource can be a portion of executable instructions or data.

In some embodiments, the computing system 300 performs one or more steps of one or more methods described or illustrated herein. In some embodiments, the computing system 300 provides functionality described or illustrated herein. In some embodiments, software running on the computing system 300 performs one or more steps or one or more methods described or illustrated herein or provide functionality described or illustrated herein. Some embodiments include one or more portions of the computing system 300.

The computing system 300 includes one or more processor(s) 301, memory 302, storage 303, an input/output I/O interface 304, a communication interface 305, and a bus 306. The computing system 300 may take any suitable physical form. For example, and not by way of limitation, the computing system 300 may be an embedded computer system, a system-on-chip (SOC), a single-board computing system (SBC), (such as, for example, s computer-on-module (COM) or system-on-module (SCM)), a desktop computing system, a laptop or notebook computer system, and interactive kiosk, a mainframe, a mesh of computers, a mobile telephone, PDA, a server, a tablet computer system, a smart speaker, or a combination of two or more of these.

The processor(s) 301 include hardware for executing instructions, such as those making up a computer program. The processor(s) 301 may retrieve the instructions from the memory 302, the storage 303, an internal register, or an internal cache. The processor(s) 301 then decode and execute the instructions. Then, the processor(s) 301 write one or more results to the memory 302, the storage 303, the internal register, or the internal cache. The processor(s) 301 may provide the processing capability to execute the operation system, programs, user and application interfaces, and any other functions of the computing system 300.

The processor(s) 301 may include a central processing unit (CPU), one or more general-purpose microprocessor(s), application-specific microprocessor(s), and/or special purpose microprocessor(s), or some combination of such processing components. The processor(s) 301 may include one or more graphics processor, video processors, audio processors and/or related chip sets.

In some embodiments, the memory 302 includes main memory for storing instructions for the processor(s) 301 to execute or data for the processor(s) 301 to operate on. By way of example, the computing system 300 may load instructions from the storage 303 or another source to the memory 302. During or after execution of the instruction, the processor (s) 301 may write one or more results (which may be intermediate or final results) to the memory 302. One or more memory buses (which may each include an address bus and a data bus) may couple the processor(s) 301 to the memory 302. One or more memory management units (MMUs) may reside between the processor(s) 301 and the memory 302 and facilitate accesses to the memory 302 requested by the processor(s) 301. The memory 302 may include one or more memories. The memory 302 may be random access memory (RAM).

The storage 303 stores data and/or instructions. As an example and not by way of limitations, the storage 303 may include a hard disk drive, a floppy disk drive, flash memory, an optical disc, a magneto-optical disc, magnetic tape, or a Universal Serial Bus (USB) drive or a combination of two or more of these. In some embodiments, the storage 303 is removable medium. In some embodiments, the storage 303 is a fixed medium. In some embodiments, the storage 303 is internal to the computing system 300. In some embodiments, the storage 303 is external to the computing system 300. In some embodiments, the storage 303 is non-volatile, solid state memory. In some embodiments, the storage 303 includes read-only memory (ROM). Where appropriate, this ROM may be masked-programmed ROM, programmable ROM (PROM), erasable PROM (EPROM), electrically erasable PROM (EEPROM), electrically alterable ROM (EAROM), or flash memory or a combination of two or more of these. The storage 303 may include one or more memory devices. One or more program modules stored in the storage 303 may be configured to cause various operations and processes described herein to be executed.

The I/O interface 304 includes hardware, software, or both providing one or more interfaces for communication between the computing system 300 and one or more I/O devices. The computing system 300 may include one or more of these I/O devices, where appropriate. One or more of these I/O devices may enable communication between a person and the computing system 300. As an example and not bay of limitation, an I/O device may include a keyboard, keypad, microphone, monitor, mouse, speaker still camera, stylus, tablet, touch screen, trackball, video camera, another suitable I/O device or a combination of two or more of these. An I/O device may include one or more sensors. In some embodiments, the I/O interface 304 includes one or more device or software driers enabling the processor(s) 301 to drive one or more of these I/O devices. The I/O interface 304 may include one or more I/O interfaces.

The communication interface 305 includes hardware, software, or both providing one or more interfaces for communication (such as, for example, packet-based communication) between the computing system 300 and one or more other computing systems or one or more networks. As an example and not by way of limitation, the communication interface 305 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 305 for it. As an example and not by way of limitation, the computing system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communication (GSM) network), or other suitable wireless network or a combination of two or more of these. The computing system 300 may include any suitable communication interface 305 for any of these networks, where appropriate. The communication interface 305 may include one or more communication interface 305.

The bus 306 interconnects various components of the computing system 300 thereby enabling the transmission of data and execution of various processes. The bus 306 may include one or more types of bus structures including a memory bus or memory controller, a peripheral bus, and a local bus using any of a variety of bus architectures.

Figure 4:
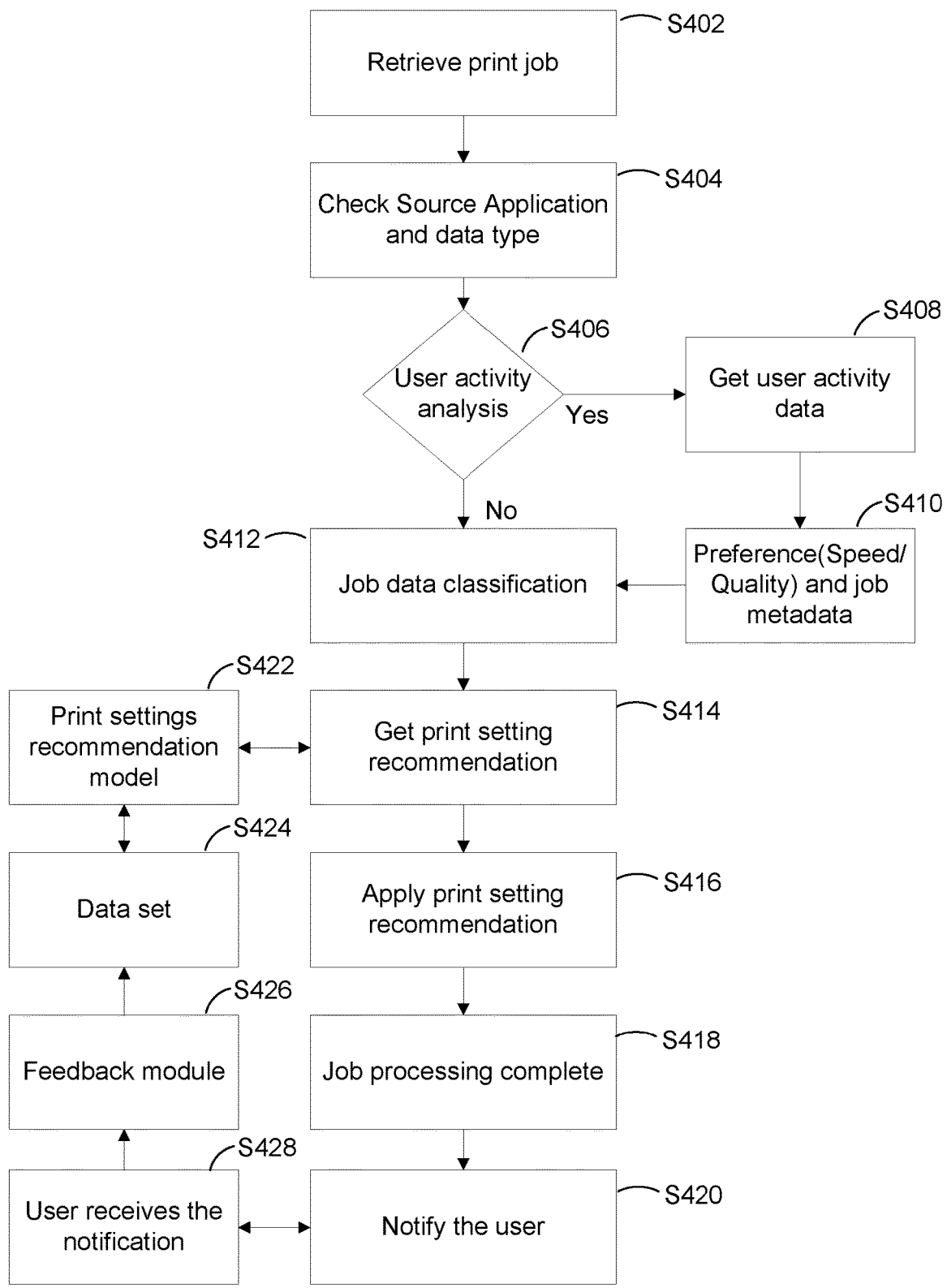
FIG. 4 illustrates exemplary flow diagrams setting forth various algorithms executed by computing devices used to implement a print intent recommendation engine according to the present disclosure.

FIG. 4 represent a flow diagram detailing an exemplary operation used to implement a print intent recommendation engine. The print intent recommendation engine provides features where analyzing a print document and print intent generates recommended print settings which are applied to a print job by using various machine-learning models. The print settings include, but are not limited to, page size, borderless printing, duplexing, media type, staple, print resolution, colors, hole punch, binding, orientation, copying, collating, media quality, print quality, and margins.

In step S402, the print intent recommendation engine retrieves a print job as well as source application and source job data type of the print job when it is available.

In step S404, the print intent recommendation engine determines the source application and the source job data type. The source application describes the name of the application that submits the current print job e.g. Microsoft Edge, Chrome, Microsoft Word, PowerPoint, etc. The source job data type is an original data type of the print job, it could be a PDF document from a local drive, pptx file from SharePoint, MSN, Yahoo, website content, or forms from government websites.

In step S406, the print intent recommendation engine, which uses one or more machine-learning models, determines based on the retrieved source application and source job data type whether user activity analysis is required or not. In step S408, the print intent recommendation engine determines that user activity analysis is required, the print intent recommendation engine makes a request to a user-activity machine-learning model. The user-activity machine-learning model is a model that is trained to provide user's activities from various sources. In step S410, a user-activity-data-analysis module retrieves the user's activities such as but not limited to past user print activities, which references similar source types of print jobs that were printed previously by the user, various calendar sources which indicate a schedule of the user's activities within a future time span to associate the print job data to the user's activities, and corresponding data related to each of the activities and data related to the print job.

When relation between print job data and user activity is established, the results are generated as input information to the print intent recommendation engine. The following describes an example of the relation between the print job data and user activity analysis data. In a situation where checking current print job data which belongs to any of the user activities that will be taking place within a future time span. If the job preference is marked as speed, the print job should be printed as quickly as possible. If the job preference is not marked as speed but marked as quality, print speed decreases as the print quality is increased. The user-activity-data-analysis modules provide metadata about the print job if the print data is related to the specific user activity that belongs to some entity that requires specific printing guidelines (e.g.: printing guidelines for VISA document from a government entity). The generated input information will be sent to a job-data classification machine-learning model along with the print job data. The job-data classification machine-learning model is a model that is trained to provide print job classification details of the print job such as but not limited to category, sub-category, importance, and data security.

In step S412, a job-data classification module uses one or more domain trained machine-learning modules to receive data inputs regarding data from the user's activities and data from the print job. The job-data classification machine-learning model processes the received data inputs to provide output of classification details of the print job such as but not limited to category, sub-category-importance, and data security.

In step S414, the print intent recommendation engine makes a request to a print recommendation machine-learning model, the print setting recommendation machine-learning model is trained to provide print setting recommendations for the print jobs. The print setting recommendation module receives the output of the classification details provided by the job-data classification machine-learning model and processes the received job-data classification details to output the print setting recommendations for the user of the submitted print job.

In step S416, the recommended print settings for the user is applied to the submitted print job and the print job is returned to the image processing device. In step S418, the image processing device processes the print job.

In step S420, the user will be informed through a bot conversation provide by a feedback module in step S426 where the user can provide feedback to the print settings recommendation machine-learning model in step S422, where the data of the user provide feedback obtained from the feedback module is stored in step S424 and then can be used for future training of the print settings recommendation machine-learning model.

In one embodiment, a method for device applying smart print settings to the print job comprises service subscription process wherein user must sign up to the service through a web portal application or client application. Through the signup process, the user selects multiple cloud endpoints and selects subscribe. Subscription service performs authentication where user authorizes device or device specific service to make calls to the selected endpoint service for accessing user-activity data on behalf of the user.

Figure 5:
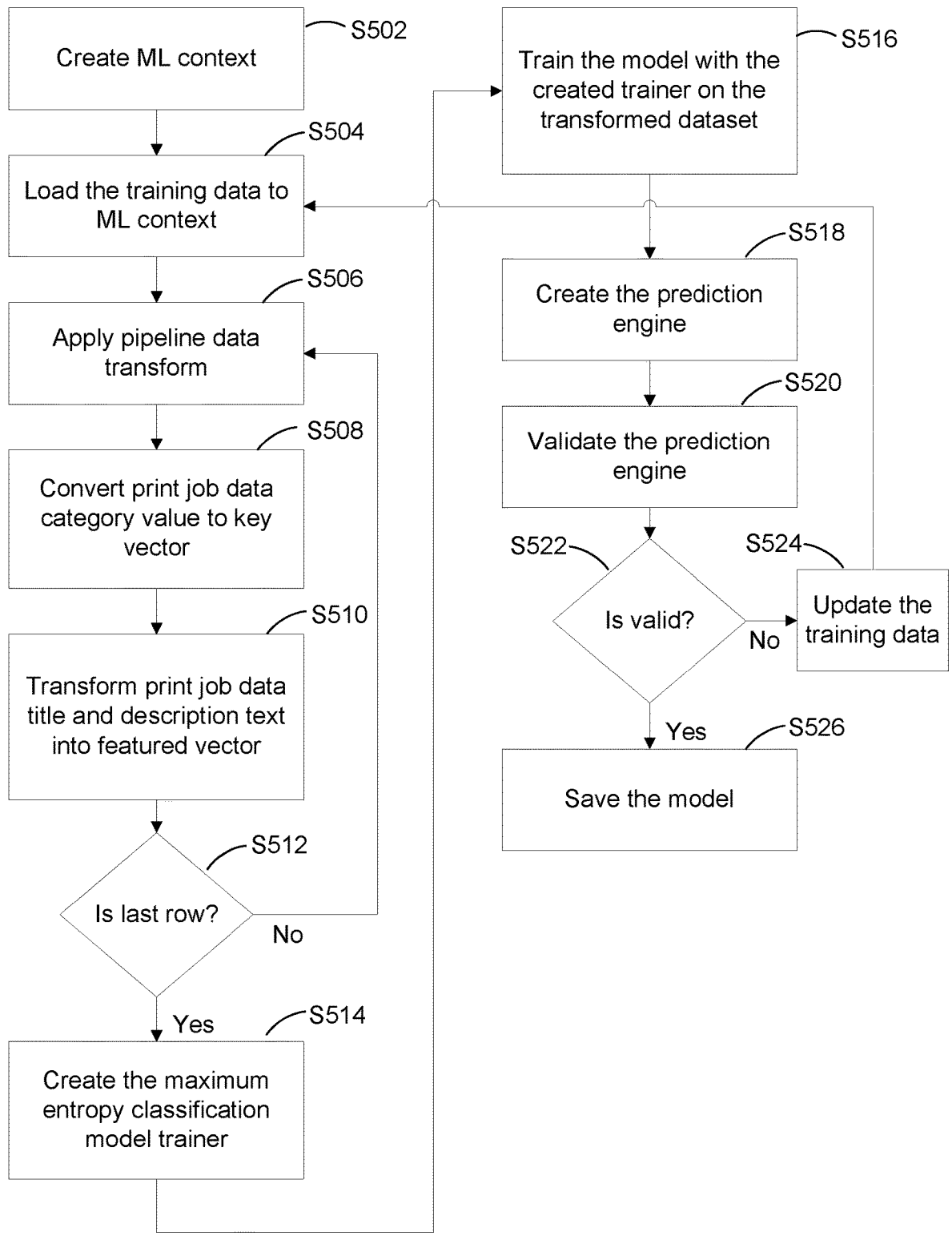
FIG. 5 illustrates exemplary flow diagrams setting forth various algorithms executed by computing devices used to implement the building and training of a base model used for print job data classification.

FIG. 5 represents a flow diagrams detailing an exemplary operation used to implement the building and training of a base model used for job-data classification machine-learning model. Any available software framework may be used to build and train the job-data classification machine-learning model.

In step S502, create machine-learning context for building the base model for the job-data classification machine-learning model. The machine-learning context describes one or more job-data classification categories, such as but not limited to, job identification, relatable subject areas for print, title and description of the print job.

In step S504, load training data which includes print job information and job-data classification information to machine-learning context.

In step S506, apply pipeline data transform to process the data extraction and loading to initiate the building of the machine-learning model. In step S508, convert print job data category value to key vector. In step S510, transform print job data title and description text into featured vector. The processed data are transformed to represent individual measurable properties or characteristics values being observed for use in algorithms to build the job-data classification machine-learning model. In step S512, determine if the machine-learning context is the last input by being in the last row of a structure table. If it is determined to be the last row, proceed to step S514, if it is determined not to be in the last row, proceed to step S506.

In step S514, create a maximum entropy classification model trainer. The maximum entropy classification model trainer is a probabilistic classifier that is able to predict, given an observation of an input, a probability distribution over a set of classifications, rather than only outputting the most likely classification that the observation should belong to. In step S516, train the base model with the created maximum entropy classification model trainer on the transformed dataset, updating the training data and further training the model. In step S518, create the prediction engine to implement the print intent recommendation engine. In step S520, validate the prediction engine. In step S522, determine if the prediction engine is valid? In step S524, update the training data job-data classification machine-learning model. In step S526, save the job-data classification machine-learning model.

FIG. 6 illustrates example embodiment of 9 defined clusters for cluster analysis using a k-means clustering algorithm. The k-means clustering algorithm is an unsupervised learning algorithm used in machine learning, where the unsupervised learning algorithm observes undetected attributes/features in datasets with no pre-existing labels. The k-means clustering algorithm is an iterative algorithm that partitions the observed undetected attributes/features in datasets into a number of predefined non-overlapping distinct clusters or subgroups. A clustering analysis performs to group or segment the datasets with shared attributes/features. The clustering analysis identifies the shared attributes/features in the datasets and reacts based on the presence or absence of such shared attributes/features in each new piece of data. While other unsupervised learning algorithms may be used, the selected algorithm is dependent upon the business requirements and data requirements.

In one embodiment, print job sample data are processed with their applied print settings, these attributes/features of the print job sample data can be grouped into distinct clusters without much overlapping so that the print job sample data does not get grouped to more than one classification. The print job sample data must be classified into one of the clusters to avoid the overlapping of the print job sample data. The print job sample data provide attributes/features of the print job, such as but not limited to, a print job name, a source to determine where the print job is obtained, metadata which include other data not defined by print settings, a time of day to determine when the print job was created, a day of the week to determine the day the print job was created, a calendar event to determine a meeting event, a document type model to determine whether the print job is a personal/home document or work document, a document important to determine whether the personal/home document or work document is important, and a cluster model to group up the documents into various clusters, wherein a specific print intent workflow is assigned to each cluster. Personal/home documents are related to but not limited to public web sites forms, personal billings, new articles, passport application forms, etc. Work documents contain specified metadata which describe work related descriptions.

In FIG. 6, the print job attributes are used to process the two derived features, personal/home documents or work documents and the importance of the personal/home documents or work documents. In order to determine whether a personal/home document classification or work document classification is assigned to each cluster, a graph calculation generates a score, wherein along a y-axis of 0 to 1 scale to score the document type, a value of 0 represents a personal/home document and a value of 1 represents a work document, wherein the values are between 0.0 to 1.0. Along a x-axis of 0 to 1 scale to score the document importance, a value of 0 represents low important and a value of 1 present high important, wherein the values are between 0.0 to 1.0. Take any point on the graph and calculate the score using the smallest distance between given points and the center point or centroid of each of the clusters. A classification threshold defines a binary value from a returned probability. For example, if the threshold value is set to 0.5. A value above the threshold indicates a personal/home document and a value below the threshold indicates a work document. The threshold value is dependent on the returned probabilities and requires training, therefore the threshold is determined based on the training data and testing the machine-learning models. As the training models mature, the threshold values can increase in value. The scores of the processed documents determine the group where the print job are placed into various clusters where a specific print intent workflow is assigned to each of the clusters.

Figure 7:
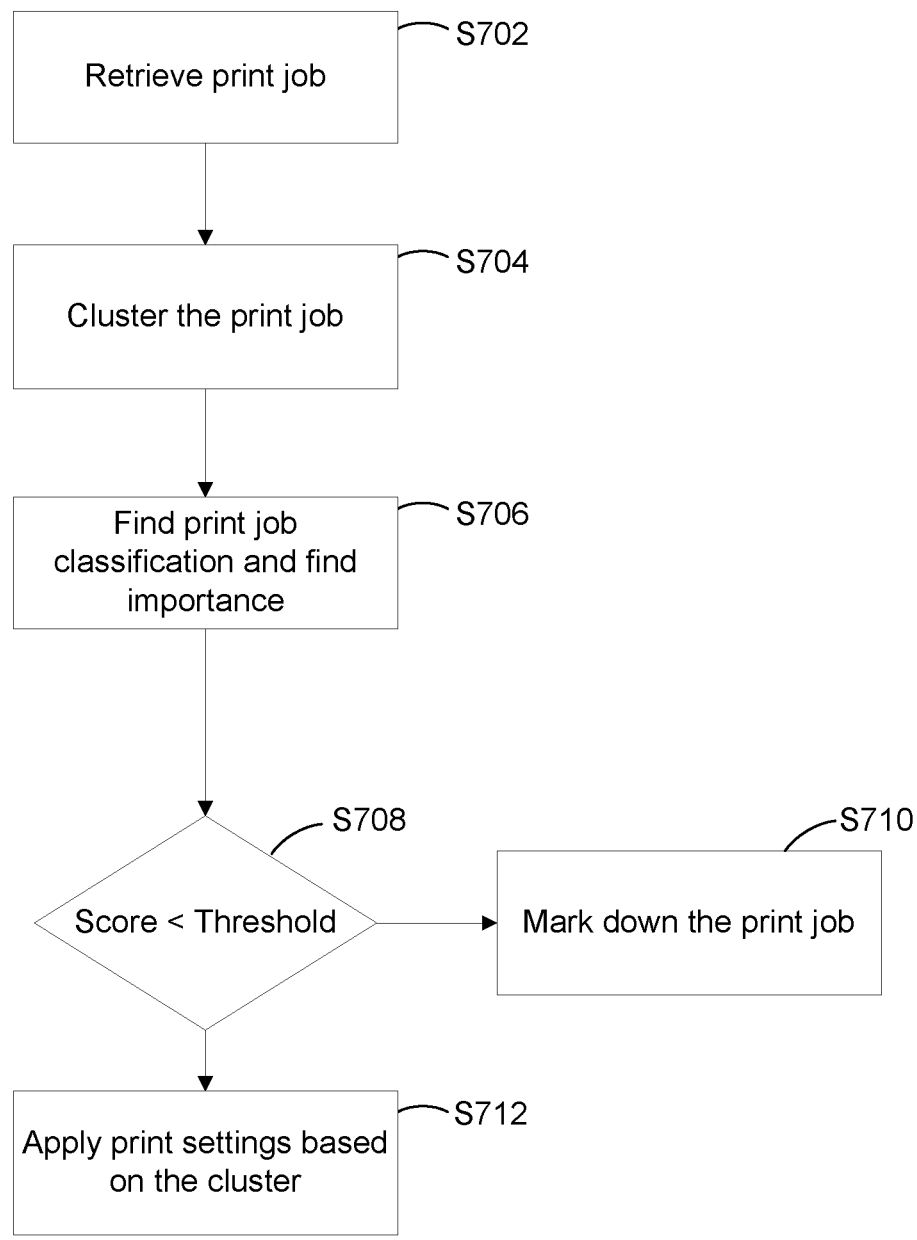
FIG. 7 illustrates exemplary flow diagrams setting forth various algorithms executed by computing devices used to implement the print job data classification and print setting recommendation module according to the present disclosure.

FIG. 7 represents a flow diagram detailing an exemplary operation used to implement the job-data classification module and print setting recommendation module.

In step S702, the print intent recommendation engine retrieves the print job. In step S704, cluster the print job using the k-means clustering algorithm. In step 706, predict the print job classification to determine whether the print job is a personal/home document or work document and predict the importance of the personal/home document or work document. The classification models returns their predictions with scores. In step S708, determine if the score is less than a threshold value. In step S710, mark down the print job to a print ready format. In step S712, apply the recommended print settings based on the cluster.

Figure 8A:
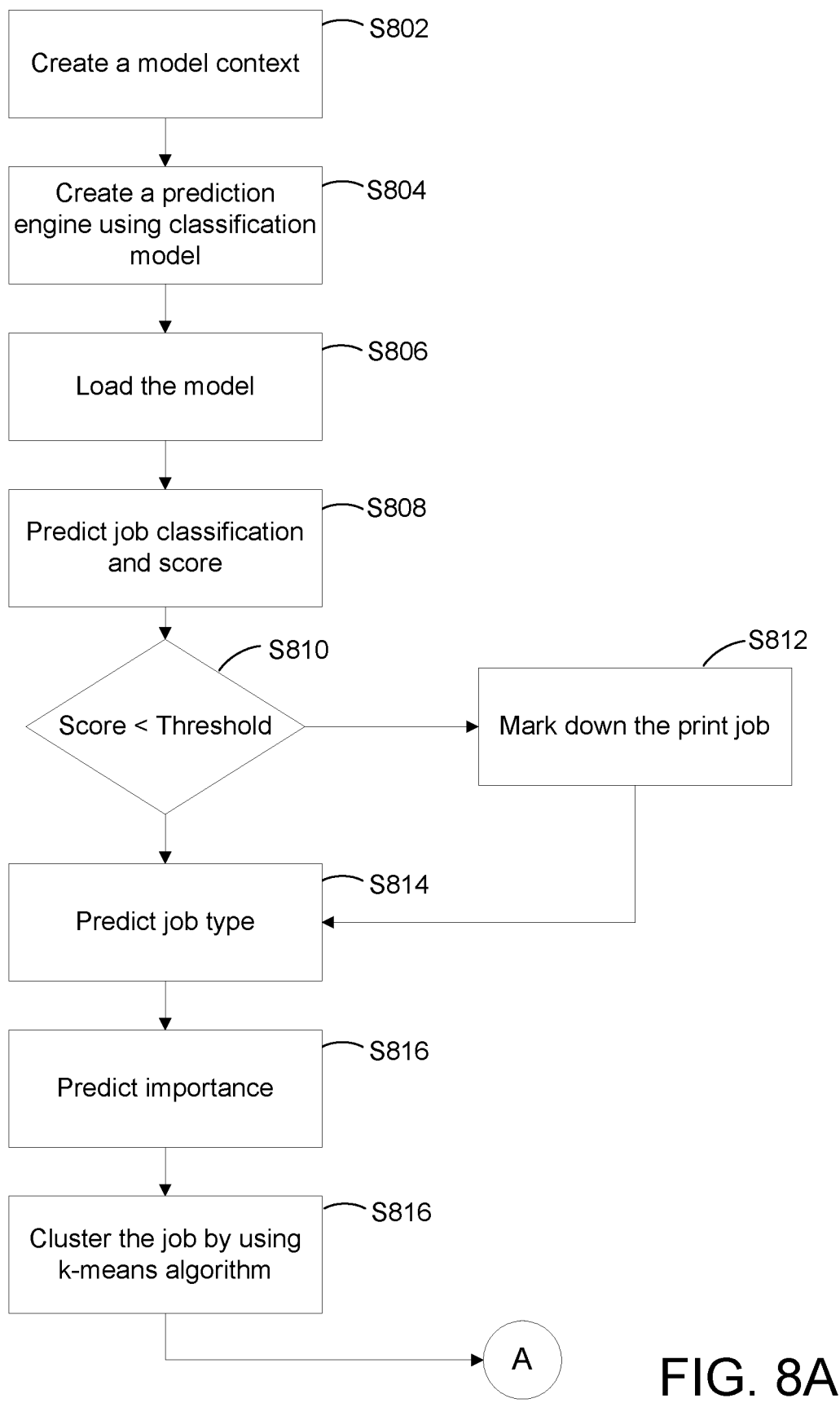
FIGS. 8A-8C illustrate exemplary flow diagrams setting forth various algorithms executed by computing devices used to implement the print intent recommendation engine workflow according to the present disclosure.
Figure 8B:
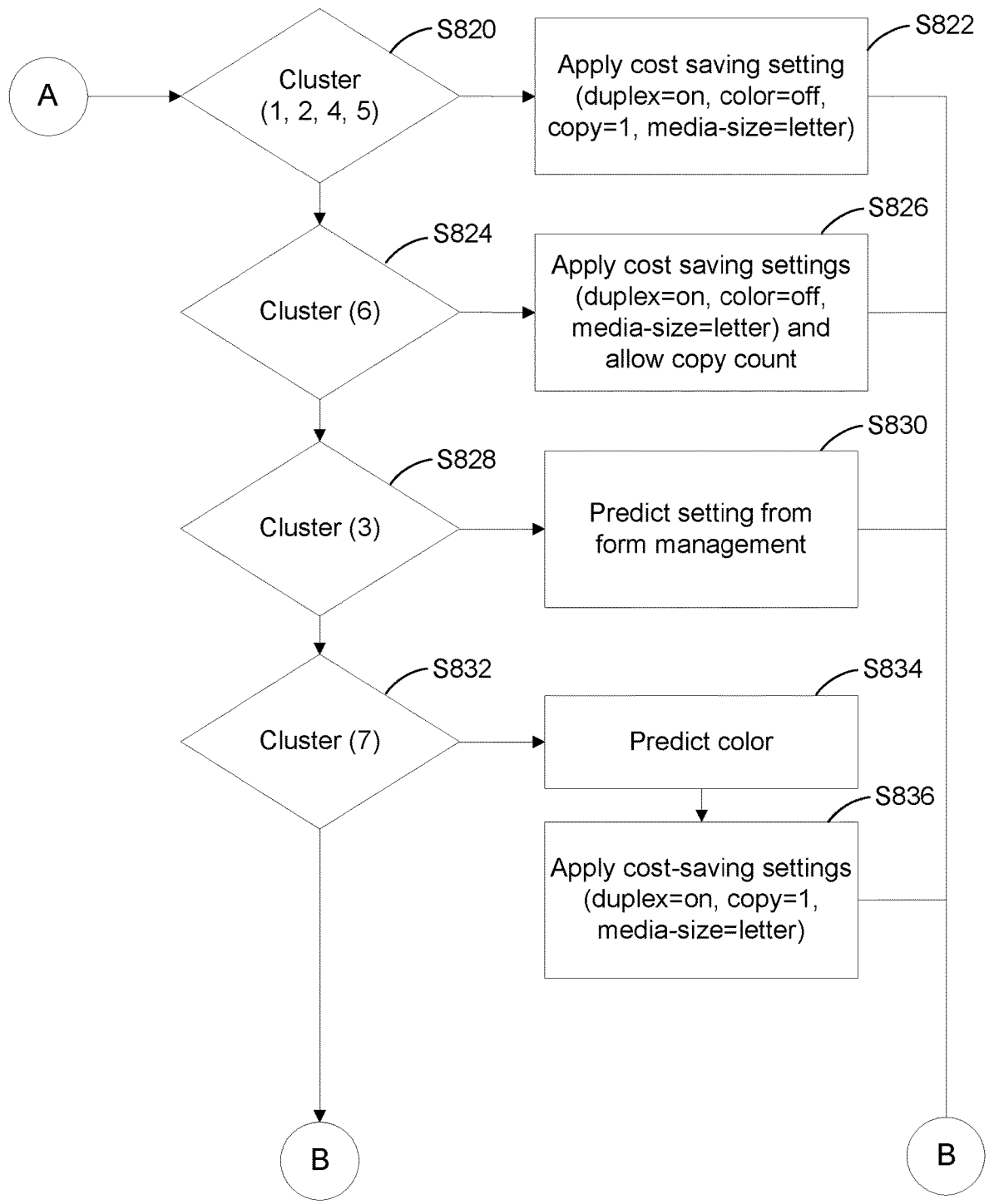
Figure 8C:
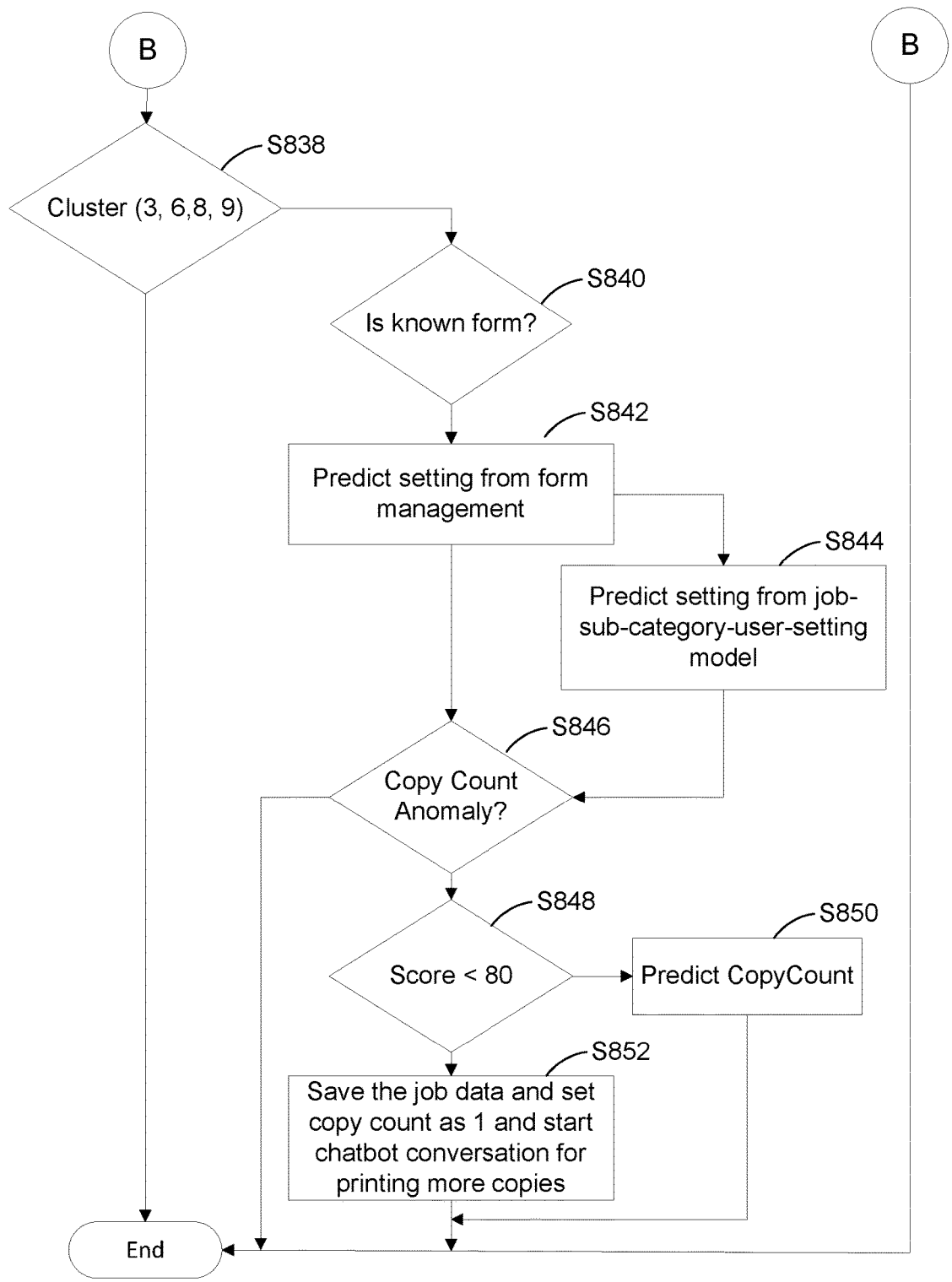

FIGS. 8A-8C represents a flow diagram detailing an exemplary operation used to implement the print intent recommendation engine workflow.

In step S802, the print intent recommendation engine creates machine-learning context for building the base models for the job-data classification machine-learning model. In step S804, create a prediction engine for print setting recommendations using the job-data classification machine-learning model. In step S806, load the trained machine-learning model. In step S808, predict job classification and score. In step S810, determine if the score is less than a threshold value. In step S812, mark down the print job to a print ready format. In step S814, predict the print job classification to determine whether the print job is a personal/home document or work document. In step S816, predict the importance of the personal/home document or work document. In step S818, cluster the print job using the k-means clustering algorithm.

In step S820, the print job is input to cluster 1, 2, 4 or 5. In step S822, apply cost saving print setting, such as but not limited to, duplex set to on, color is set to off, copy count is set to 1 copy, and media size is set to letter.

In step S824, the print job is input to cluster 6. In step S826, apply cost saving print settings such as but not limited to, duplex set to on, color is set to off, media size is set to letter, and copy count is set to allow.

In step S828, the print job is input to cluster 3. In step S830, predict setting from form management. The form management provide already set print settings on the document dependent on the type of form required.

In step S832, the print job is input to cluster 7. In step S834, predict the color, whether to set to on or off. In step S836, apply cost saving print setting, such as but not limited to, duplex set to on, copy count is set to 1 copy, and media size is set to letter.

In step S838, the print job is input to cluster 3, 6, 8, or 9. In step S840, determine if the print job is a known form. In step S842, the print job is a known form and predict settings from the form management. In step S844, if the print job is not a known form, predict settings from sub-category, item attributes/features and personalized model as in user settings. In step S846, determine if there is a copy count anomaly. In step S848, there is a copy count anomaly, if the predicted score is under a threshold set to 80, in step S850 predict a copy count. Otherwise, in step S852 save the job data and set copy count as 1 and start a chatbot conversation for printing more copies. The chatbot is able to communicate with the user devices and printing apparatuses.

At least some of the above descriptions serve to explain principles of the disclosure, but the disclosure should not be limited to the examples described above. For example, the order and/or timing of some of the various operations may vary or the type of network or servers may vary from the examples given above without departing from the scope of the disclosure.

The scope of the present disclosure includes a non-transitory computer-readable storage medium storing instructions that, when executed by one or more processors, cause the one or more processors to perform one or more embodiments of the disclosure described herein.

While the present disclosure has been described with reference to exemplary embodiments, it is to be understood that the disclosure is not limited to the disclosed exemplary embodiments.

What is claimed is:

1. A system for providing print intent setting recommendations based on content of a print job for an image processing device, the system comprising:
   a memory that stores a set of instructions; at least one processor that is in communication with the memory, the processor executes the instructions of:
   retrieving a print job, wherein the print job includes print data, a source application and source job data type;
   determining if the print job requires a user activity analysis based on the source application and the source job data type, wherein if it is determined that the user activity analysis is required, request a user-activity machine-learning model to provide user activity analysis data;
   establishing a relation between the print job and the user activity analysis data to generate input information to a job-data classification machine-learning model, wherein the job-data classification machine-learning model provides print job data classification details as input information to a print setting recommendation machine-learning model, the print setting recommendation machine-learning model processes the received print job data classification details and outputs a print setting recommendation; and
   applying the print setting recommendation to the print job and process the print job on the image processing device.

2. The system according to claim 1, wherein the source application is an application that submits the print job and the source job data type is an original data type of the print job.

3. The system according to claim 1, wherein the print settings include page size, borderless printing, duplexing, media type, staple, print resolution, colors, hole punch, binding, orientation, copying, collating, media quality, print quality, and margins.

4. The system according to claim 1, wherein the user-activity machine-learning model is a model that is trained to provide user activities from a plurality of sources.

5. The system according to claim 1, wherein the user activity analysis data consist of metadata about the print job in a case where the print data is related to the specific user activities.

6. The system according to claim 1, wherein the job-data classification machine-learning model is a model that is trained to provide print job classification details of the print job, wherein print job attributes are used to process two derived features, personal/home documents or work documents and importance of the personal/home documents or work documents, wherein the print jobs are input into clusters using the k-means clustering algorithm.

7. The system according to claim 1, wherein the print setting recommendation machine-learning model is a model that is trained to provide print setting recommendations for the print jobs, wherein the applied print setting recommendations are based on a plurality of clusters with a specific print intent workflow.

8. A method for providing print intent setting recommendations based on content of a print job for an image processing device, the method comprising:
   retrieving a print job, wherein the print job includes print data, a source application and source job data type;
   determining if the print job requires a user activity analysis based on the source application and the source job data type, wherein if it is determined that the user activity analysis is required, request a user-activity machine-learning model to provide user activity analysis data;
   establishing a relation between the print job and the user activity analysis data to generate input information to a job-data classification machine-learning model, wherein the job-data classification machine-learning model provides print job data classification details as input information to a print setting recommendation machine-learning model, the print setting recommendation machine-learning model processes the received print job data classification details and outputs a print setting recommendation; and applying the print setting recommendation to the print job and process the print job on the image processing device.

9. The method according to claim 8, wherein the source application is an application that submits the print job and the source job data type is an original data type of the print job.

10. The method according to claim 8, wherein the print settings include page size, borderless printing, duplexing, media type, staple, print resolution, color mode, hole punch, binding, orientation, copying, collating, media quality, print quality, and margins.

11. The method according to claim 8, wherein the user-activity machine-learning model is a model that is trained to provide user activities from a plurality of sources.

12. The method according to claim 8, wherein the user activity analysis data consist of metadata about the print job in a case where the print data is related to the specific user activities.

13. The method according to claim 8, wherein the job-data classification machine-learning model is a model that is trained to provide print job classification details of the print job, wherein print job attributes are used to process two derived features, personal/home documents or work documents and importance of the personal/home documents or work documents, wherein the print jobs are input into clusters using the k-means clustering algorithm.

14. The method according to claim 8, wherein the print setting recommendation machine-learning model is a model that is trained to provide print setting recommendations for the print jobs, wherein the applied print setting recommendations are based on a plurality of clusters with a specific print intent workflow.

15. A non-transitory computer-readable storage medium storing instructions, that, when executed by one or more processors, cause the one or more processors to perform operations comprising:

retrieving a print job, wherein the print job includes print data, a source application and source job data type;

determining if the print job requires a user activity analysis based on the source application and the source job data type, wherein if it is determined that the user activity analysis is required, request a user-activity machine-learning model to provide user activity analysis data;

establishing a relation between the print job and the user activity analysis data to generate input information to a job-data classification machine-learning model, wherein the job-data classification machine-learning model provides print job data classification details as input information to a print setting recommendation machine-learning model, the print setting recommendation machine-learning model processes the received print job data classification details and outputs a print setting recommendation; and applying the print setting recommendation to the print job and process the print job on the image processing device.

\* \* \* \* \*